United States Patent [19]

Wallace et al.

[11] Patent Number: 4,656,023

[45] Date of Patent: Apr. 7, 1987

[54] HYPERSTOICHIOMETRIC ZIRCONIUM-TITANIUM-CHROMIUM IRON ALLOYS

[75] Inventors: William E. Wallace, Pittsburgh, Pa.; Gui-Yu Yu, Nanjing, China

[73] Assignee: Koppers Company, Inc., Pittsburgh, Pa.

[21] Appl. No.: 744,681

[22] Filed: Jun. 14, 1985

[51] Int. Cl.$^4$ .................. C01B 6/00; C22C 30/00
[52] U.S. Cl. .................. 423/644; 420/583; 420/900
[58] Field of Search ............... 420/900, 581, 583, 588, 420/422; 423/644, 648 R; 75/126 B, 126 D

[56] References Cited

PUBLICATIONS

Fuji, H. et al., "Magnetic, Crystallographic, and Hydrogen-Storage Characteristics of $Zr_{1-x}Ti_xMN_2$ Hydrides", J. Phys. Chem. 1981, 85, 3112–3116.

Shaltiel et al., "Hydrogen Absorption and Desorption Properties of $AB_2$ Laves–Phase Pseudobinary Compounds", J. Less–Comm. Metals, 53 (1977), 117–131.

Jacob et al., "Hydrogen Sorption Properties of Some $AB_2$ Laves Phase Compounds", J. Less–Common Metals, (65) 1979, pp. 117–128.

*Primary Examiner*—Christopher W. Brody
*Attorney, Agent, or Firm*—Donald M. MacKay; Herbert J. Zeh, Jr.

[57] ABSTRACT

Hydrogen storage materials are provided by a quaternary alloy of the formula:

$$Zr_{1-x}Ti_xCrFe_y$$

wherein x has a value in a range from 0.1 to 0.3, and y has a value in a range from 1.2 to 1.4, and their hydrides.

8 Claims, 5 Drawing Figures

HYPERSTOICHIOMETRIC ZIRCONIUM-TITANIUM-CHROMIUM IRON ALLOYS

BRIEF DESCRIPTION OF THE INVENTION

Improved hydrogen storage materials are provided by quaternary alloy consisting of zirconium, titanium, chromium and iron, and their hydrides which alloys are characterized in having the C14 hexagonal crystal structure and $Zr Mn_2$ stoichiometry. The alloys are expressed by the empirical formula:

$$Zr_{1-x}Ti_xCrFe_y$$

wherein x has a value in a range from 0.1 to 0.3, and y has a value in a range from 1.2 to 1.4. Alloys of particular interest are:

$Zr_{0.7}Ti_{0.3}CrFe_{1.2}$
$Zr_{0.7}Ti_{0.3}CrFe_{1.3}$
$Zr_{0.9}Ti_{0.1}CrFe_{1.4}$

Each of these alloys is characterized in having a desirable combination of properties. For example, the hydrogen capacities are quite high, the volumetric capacities being from 1.10 to 1.32 with respect to that of liquid hydrogen, the weight capacities from 159.9–178.9 cc $H_2/g$ alloy. In addition, the alloys were found to be rapid hydrogen absorbers. Eighty percent of the hydrogen was absorbed or desorbed in about 2 minutes. Representative plots of hydrogen amounts absorbed or desorbed versus time are shown in FIG. 4 for $Zr_{0.7}Ti_{0.3}CrFe_{1.3}$ and its hydride.

DETAILED DESCRIPTION OF THE INVENTION

Figure 1:
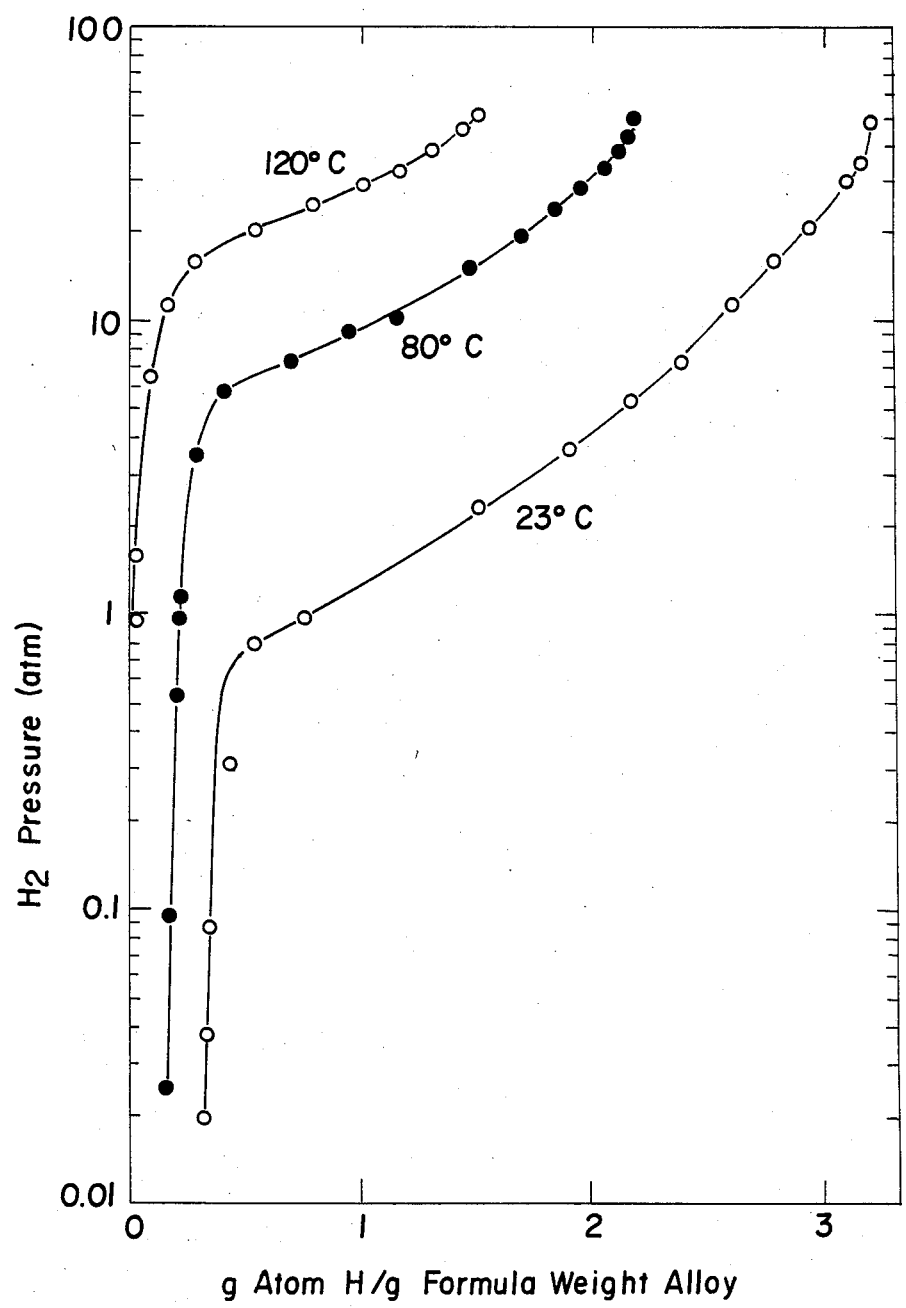
FIG. 1 is a Pressure-composition isotherm for $Zr_{0.7}Ti_{0.3}CrFe_{1.2}$—$H_2$ system.

A quaternary alloy of the invention is characterized as a Laves-type intermetallic compound composed of zirconium, titanium, chromium, and iron in a C14 hexagonal crystal structure. The crystal structure has lattic parameters in the following ranges:

a=4.975 Å to 4.997 Å
c=8.135 Å to 8.167 Å

A general procedure for preparations of these quaternary alloys is as follows. Weighed amounts of the zirconium, titanium, and iron constituents were placed in a copper boat for heating to a fusing termperature. Heating was accomplished by means of an r.f. 450 kHz induction heater. The copper boat was mounted inside a vacuum-tight quartz tube through which a stream of Ti-gettered argon passed during the heating period. Fusing took place by heating a mixture of these constituents to about 1500° C. in about two minutes and holding at that temperature for about two minutes. Then the sample was cooled to room temperature in a period of about one minute and the hardened sample turned over in the boat. Melting and cooling were repeated through 6-8 cycles. After two melting/cooling cycles, the sample was weighed for determination of weight loss, which loss typically was negligible. Then a weighed amount of chromium, which includes a 10% stoichiometric excess of chromium over the amount desired in the final sample, was added to the fused zirconium-titanium-iron sample. Excess chromium was required to compensate for loss of chromium by evaporation. Cycles of melting and weighing of the sample were carried out until the weight corresponded to that of the sample with the appropriate quantity of Ca. Usually, the actual chromium content of a sample was controlled to within ± one percent of the theoretical amount. Then the sample was annealed at about 1000°–1050° C. for 4–6 hours to insure homogeneity. X-ray diffraction analysis of the annealed sample typically showed a material consisting of a single phase.

In order to activate the sample to make it suitable as a hydrogen storage material, about two grams of the annealed sample was placed in a stainless-steel pressure reactor vessel suitable for use in forming a hydride of the sample. The reactor was evacuated to a pressure of about $10^{-3}$ Torr. Then pure hydrogen was pumped into the reactor vessel with the temperature initially at about 25° C., until hydrogen was no longer absorbed by the sample. Usually, within two minutes of the time hydrogen was initially introduced into the reactor, the reaction vessel temperature increased to about 50° C. Then the reactor was allowed to cool to room temperature over a period of about 30 minutes, after which time the pressure within the reactor was usually about 45 atm. The pressure in the reactor was reduced to ambient, and then the sample was subjected to a pressure of about $10^{-3}$ Torr for about 20 minutes in order for the sample to desorb substantially all of the previously-absorbed hydrogen.

In order to obtain a fully-activated hydrogen storage material, the sample was subjected to about 25 sorption/desorption cylces, under conditions as described for the activation procedure above. At the end of this activation period, there was obtained a repeatable pressure-composition profile. To obtain crystal structure data on the hydrides, a portion of the activated sample was hydrogenated to a known composition in accordance with its previously-established pressure-composition isotherm. Then the hydrogenated sample was cooled quickly by quenching the reactor vessel in liquid nitrogen, and rapidly pumping away the remaining gaseous hydrogen. In accordance with the technique of Gualtieri et al., [J. Appl. Phys., 47,3432 (1976)], a few Torr of $SO_2$ was admitted to the reaction vessel to poison the surface of the sample and thereby seal in the hydrogen. After the sample warmed to room temperature, X-ray diffraction data were obtained for the sample.

In order to demonstrate the preparation of the zirconium-titanium-chromium-iron quaternary alloys and their hydrides, and to obtain data as to characteristics and properties of the alloys, three ternary alloys containing varying amounts of the four constituent elements were prepared in accordance with the aforementioned, generally-described procedures. Essential parameters such as constituent weights, melting and annealing temperatures, lattice parameters and hydriding characteristics are summarized in Tables I-II. Each of the constituents was 99.9 percent pure and was used as obtained from Alph Products, Ventron Div., Danvers, MA.

TABLE I

Preparation of $Zr_{1-x}Ti_xCrFe_y$ Quaternary Alloys

| Sample No. | Alloy | Each Constituent (gm) Zr | Ti | Cr | Fe | Melting Temp. (°C.) | Heat Treatment Melting Cyles No. | Melt Period (Min) | Annealing Temp (°C.) | Period (Hrs) | Sample Wt. Loss During Preparation (gm) |
|---|---|---|---|---|---|---|---|---|---|---|---|
| I | $Zr_{0.7}Ti_{0.3}CrFe_{1.2}$ $Zr_{0.7}Ti_{0.3}CrFe_{1.2}H_{3.2}$ | 1.505 | 0.338 | 1.225 | 1.579 | ~1500 | 7 | 2 | 1000 | 5 | 0.004 |
| II | $Zr_{0.7}Ti_{0.3}CrFe_{1.3}$ $Zr_{0.7}Ti_{0.3}CrFe_{1.3}H_{2.7}$ | 1.508 | 0.339 | 1.227 | 1.714 | ~1500 | 6 | 2 | 1000 | 5 | 0.004 |
| III | $Zr_{0.9}Ti_{0.1}CrFe_{1.4}$ $Zr_{0.9}Ti_{0.1}CrFe_{1.4}H_{3.1}$ | 1.450 | 0.084 | 0.918 | 1.381 | ~1500 | 8 | 2 | 1000 | 5 | 0.004 |

TABLE II

Lattice Parameters and Hydrogen Absorption for $Zr_{1-x}Ti_xCrFe_y$ Quaternary Alloys

| Sample No. | Alloy Alloy Hydride | Lattice Parameters a(Å) | c(Å) | Unit Cell Volume V(Å)³ | Change in Alloy Volume in Forming Hydride ΔV/V % | Hydrogen Storage Capacity γ* | ccH₂ per g · alloy @ 40 atm |
|---|---|---|---|---|---|---|---|
| I | $Zr_{0.7}Ti_{0.3}CrFe_{1.2}$ | 4.975 | 8.143 | 174.5 | | | |
|   | $Zr_{0.7}Ti_{0.3}CrFe_{1.2}H_{3.2}$ | 5.288 | 8.631 | 209 | 16.5 | 1.32 | 178.9 |
| II | $Zr_{0.7}Ti_{0.3}CrFe_{1.3}$ | 4.979 | 8.135 | 174.7 | | | |
|    | $Zr_{0.7}Ti_{0.3}CrFe_{1.3}H_{2.7}$ | 5.292 | 8.629 | 209.3 | 16.5 | 1.10 | 149.1 |
| III | $Zr_{0.9}Ti_{0.1}CrFe_{1.4}$ | 4.997 | 8.167 | 176.6 | | | |
|     | $Zr_{0.9}Ti_{0.1}CrFe_{1.4}H_{3.1}$ | 5.038 | 8.634 | 210.7 | 16.2 | 1.21 | 159.9 |

Figure 2:
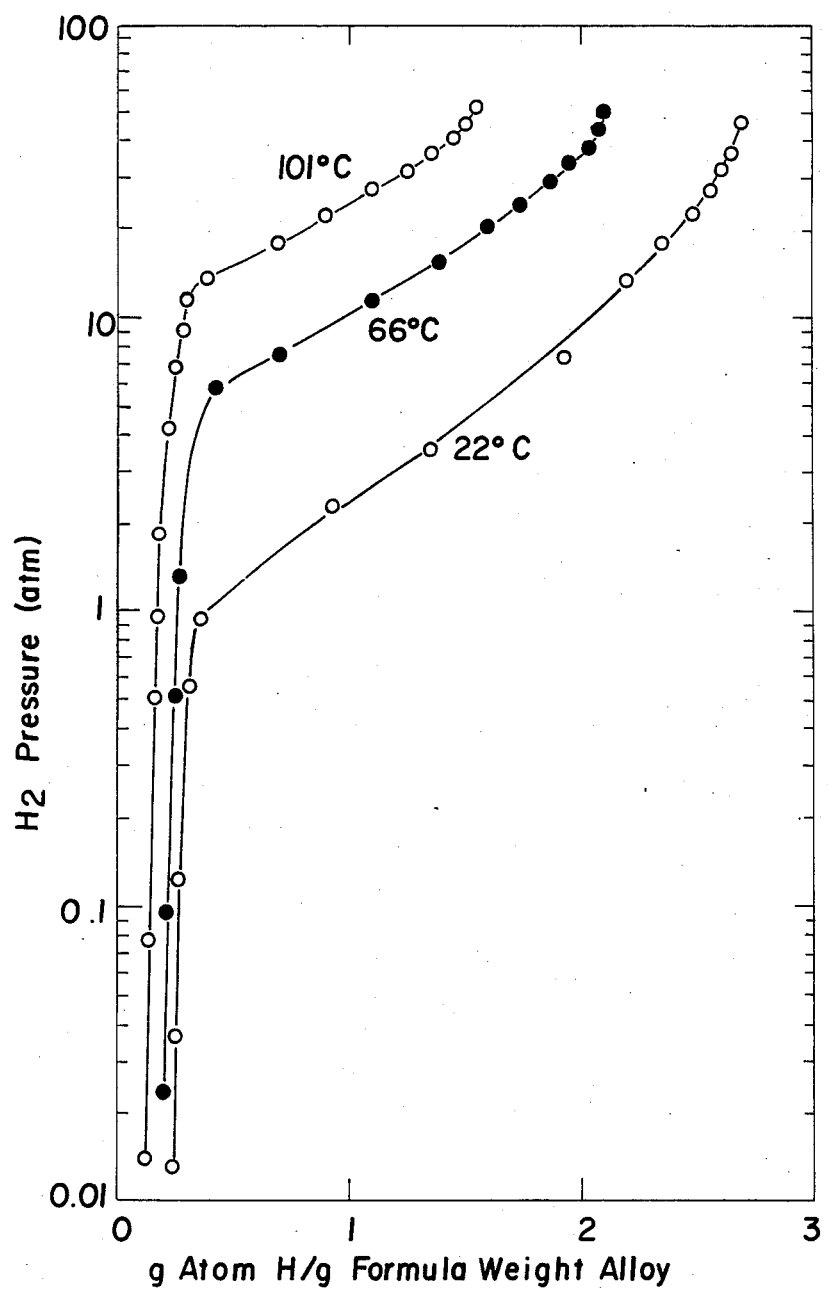
FIG. 2 is a Pressure-composition isotherm for $Zr_{0.7}Ti_{0.3}CrFe_{1.3}$—$H_2$ system.
Figure 3:
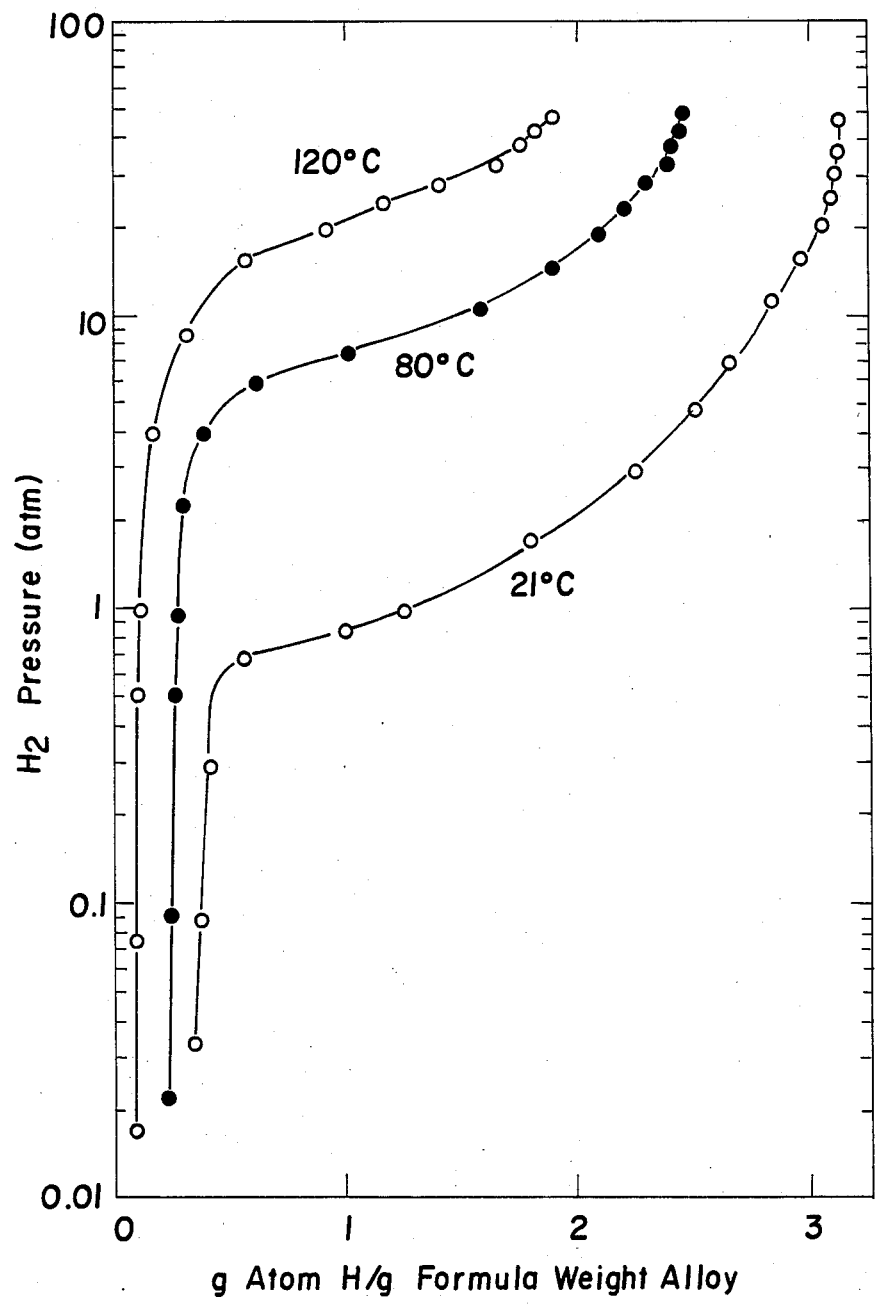
FIG. 3 is a Pressure-composition isotherm for $Zr_{0.9}Ti_{0.1}CrFe_{1.4}$—$H_2$ system.

*γ = ratio of hydrogen in the alloy to that in an equal volume of liquid hydrogen The pressure-composition isotherms of FIGS. 1-3 are associated with three representative embodiments of the zirconium-titanium-chromium-iron alloys of the invention and demonstrate important advantages of these quaternary alloys. For example, at about room temperature these three alloy systems can be hydrogenated and their hydrides dehydrogenated at hydrogen pressures of about one atm.

Figure 4A:
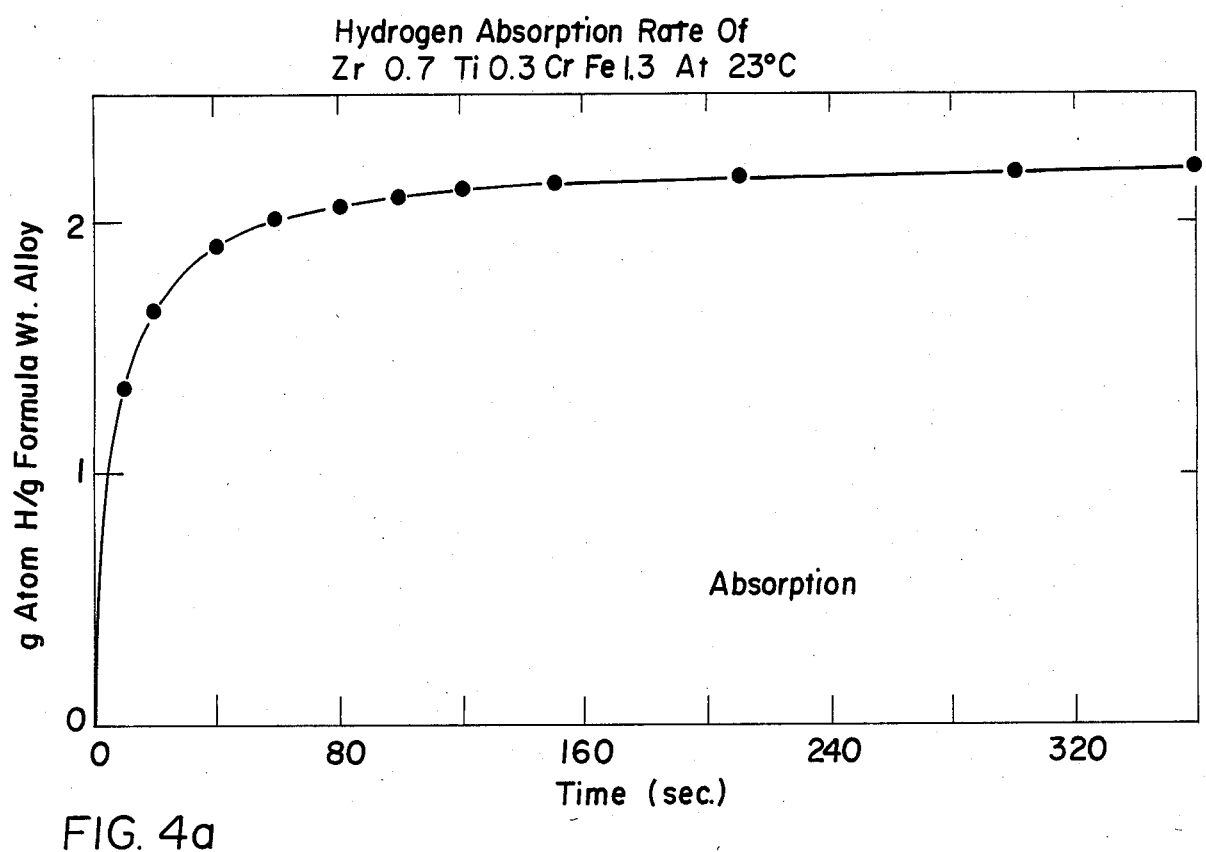
FIG. 4a and 4b show the hydrogen absorption and desorption rate of $Zr_{0.7}Ti_{0.3}CrFe_{1.3}$ and its hydride at 23° C.
Figure 4B:
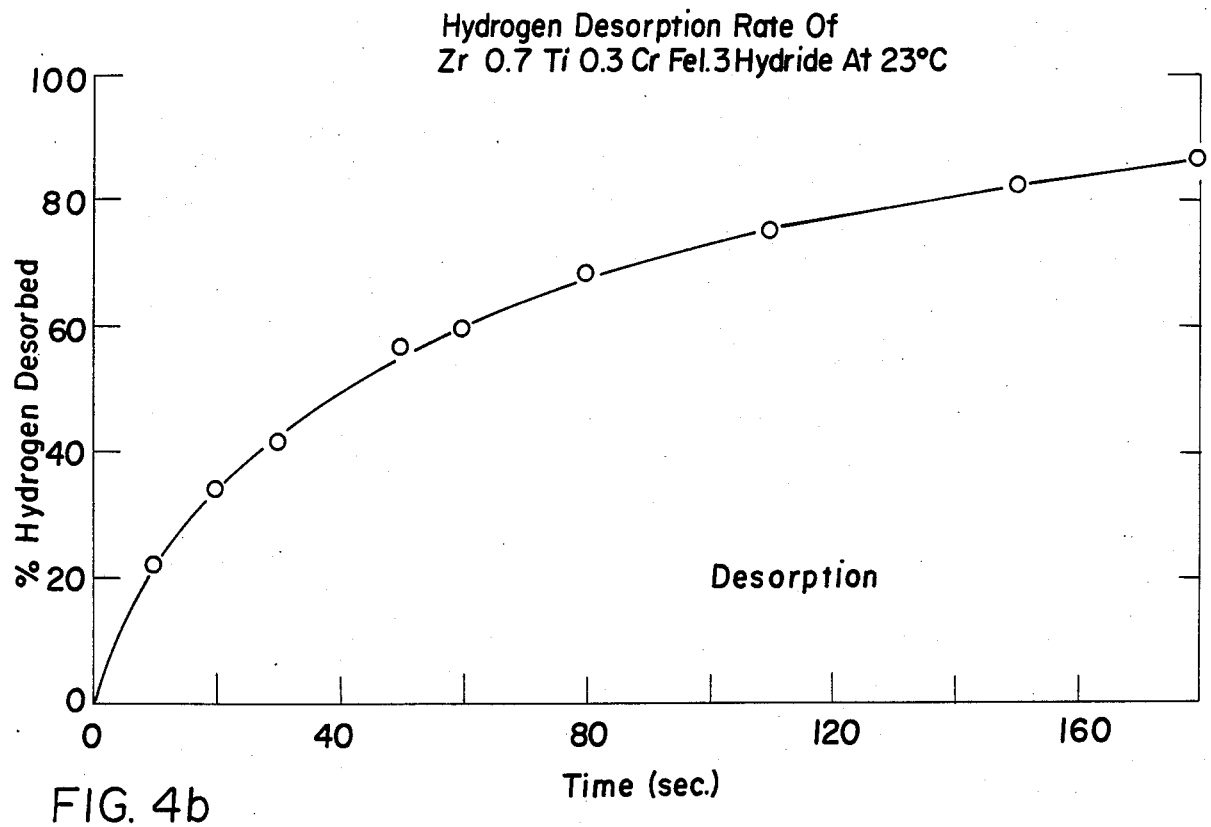

The quaternary alloys of the invention are also characterized by fairly rapid absorption/desorption of hydrogen. As shown in FIG. 4, a condition of 80 percent complete absorption or desorption of hydrogen can be obtained in about 2 minutes.

Although specific examples of the invention have been set forth hereinabove, it is not intended that the invention be limited solely thereto, but it is intended to include all of the variations and modifications falling within the scope of the appended claims.

What is claimed is:

1. A quaternary alloy of the formula:

$$Zr_{1-x}Ti_xCrFe_y$$

wherein x has a value in a range from 0.1 to 0.3, and y has a value in a range from 1.2 to 1.4, and their hydrides.

2. The alloy of claim 1 wherein x is 0.3 and y is 1.2
3. The alloy of claim 1 wherein x is 0.3 and y is 1.3.
4. The alloy of claim 1 wherein x is 0.1 and y is 1.4.
5. A hydride of the alloy of claim 1.
6. A hydride of the alloy of claim 2.
7. A hydride of the alloy of claim 3.
8. A hydride of the alloy of claim 4.

* * * * *

UNITED STATES PATENT AND TRADEMARK OFFICE
CERTIFICATE OF CORRECTION

PATENT NO. : 4,656,023

DATED : April 7, 1987

INVENTOR(S) : William E. Wallace and Gui-Yu Yu

It is certified that error appears in the above-identified patent and that said Letters Patent is hereby corrected as shown below:

The term of this patent subsequent to January 28, 2003, has been disclaimed.

Signed and Sealed this

Sixth Day of December, 1988

Attest:

DONALD J. QUIGG

*Attesting Officer*  *Commissioner of Patents and Trademarks*